(12) United States Patent
Ono et al.

(10) Patent No.: US 6,744,007 B2
(45) Date of Patent: Jun. 1, 2004

(54) LASER WELDING METHOD

(75) Inventors: Kazuhiko Ono, Takatsuki (JP); Kaoru Adachi, Hirakata (JP); Tairou Samejima, Hirakata (JP); Akitoshi Masamura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/050,832

(22) Filed: Jan. 18, 2002

(65) Prior Publication Data

US 2002/0096500 A1 Jul. 25, 2002

(30) Foreign Application Priority Data

Jan. 22, 2001 (JP) .......................................... 2001-013270

(51) Int. Cl.⁷ .............................................. B23K 20/26
(52) U.S. Cl. ................................................. 219/121.64
(58) Field of Search ...................... 219/136, 75, 121.63, 219/121.64, 121.65, 121.66

(56) References Cited

U.S. PATENT DOCUMENTS

| 4,623,777 A | * | 11/1986 | Aihara et al. ............. 219/121.6 |
| 5,714,735 A | * | 2/1998 | Offer ........................... 219/136 |
| 5,994,659 A | * | 11/1999 | Offer ........................... 219/75 |

* cited by examiner

*Primary Examiner*—Kiley Stoner
*Assistant Examiner*—Jonathan Johnson
(74) *Attorney, Agent, or Firm*—Varndell & Varndell, LLC

(57) ABSTRACT

This invention provides a laser welding method capable of supplying a filler wire to a welding object portion in a stabilized condition so as to stabilize welding quality. More specifically, the filler wire is supplied to the welding object portion while the laser beam is projected to the welding object portion. At this time, the filler wire is supplied obliquely from forward or backward in the welding advance direction such that the angle between the supplying direction and beam axis L of the laser beam is less than 45°.

8 Claims, 5 Drawing Sheets

LASER WELDING METHOD

BACKGROUND OF THE INVENTION

1. Field of the Invention

The present invention relates to laser welding method.

2. Description of the Related Art

A filler wire may be used as filler metal in order to weld a welding object portion by projecting laser beam (for example, Japanese Patent Application Laid-Open No.HEI10-263862). That is, the filler wire is fed to this welding object portion while projecting laser beam to the welding object portion so as to fuse this filler wire, thereby supplementing insufficiency of molten metal.

In some case, welding is carried out on an object, which is already subjected to preliminary welding or a structure having a step or the like (for example, FIGS. 1, 7). In this case, there is a fear that the filler wire cannot be supplied to the welding object portion because of the preliminary welding portion 11 and the step portion 12. That is, the filler wire may interfere with the preliminary welding portion 11, so that its operation maybe changed or sticking occurs. Consequently, sometimes, the filler wire may fail to be settled or a front end portion of the filler wire may be fixed to the solidified wall (wall produced by solidification of the molten welding portion). If the filler wire is supplied from forward of laser beam, it is sometimes difficult to dispose a sensor for copying a welding line.

SUMMARY OF THE INVENTION

Accordingly, the present invention has been achieved to solve the above-described problems and therefore, an object of the present invention is to provide a laser welding method capable of supplying a filler wire to a welding object portion in a stabilized condition so as to stabilize welding quality.

To achieve the above object, according to a first aspect of the present invention, there is provided a laser welding method for supplying a filler wire 4 to a welding object portion 5 while projecting laser beam 2 to the welding object portion 5, wherein the filler wire is supplied obliquely from forward or backward in a welding advance direction such that an angle between the supplying direction and beam axis L of the laser beam 2 is less than 45°.

According to the laser welding method of the first aspect, even if there is a preliminarily welded portion or a stepped portion, the laser beam is unlikely to be interfered with the preliminarily welded portion or the stepped portion because an angle between the supplying direction of the filler wire 4 and beam axis of the laser beam 2 is less than 45°. Consequently, the filler wire 4 can be supplied to a welding object portion 5 in a stabilized condition so as to stabilize welding quality.

According to a second aspect of the present invention, the filler wire 4 is supplied from backward of the laser beam 2 with respect to the welding advance direction.

According to the second aspect of the present invention, the filler wire 4 is not disposed forward in the welding advance direction. Thus, a welding line copy sensor can be provided forward in the welding advance direction so that it is located in the vicinity of the laser beam 2. As a result, a highly accurate welding line copy can be achieved.

According to a third aspect of the present invention, the laser beam 2 is woven in a direction substantially perpendicular to the welding advance direction.

According to third aspect of the present invention, even if the welding object portion 5 has a gap portion, that gap portion can be joined together securely. Further, a deflection of an irradiation position of the laser beam 2 can be absorbed, thereby suppressing a fusion failure of the welding object portion 5.

According to a fourth aspect of the present invention, $Vw/F \leq 2D/\sin\theta$ is established when an angle between the beam axis and a supplying direction of the filler wire is $\theta$, the diameter of key hole is D, supplying speed of the filler wire 4 is Vw and weaving frequency of the laser beam is F.

According to the fourth aspect of the present invention, the laser beam 2 is irradiated to a substantially entire length of the filler wire 4 to be supplied and therefore, a non-molten portion of the filler wire 4 does not arrive at a solidified wall, so that sticking can be avoided thereby leading to stabilization of welding quality.

DESCRIPTION OF THE PREFERRED EMBODIMENTS

Figure 3:
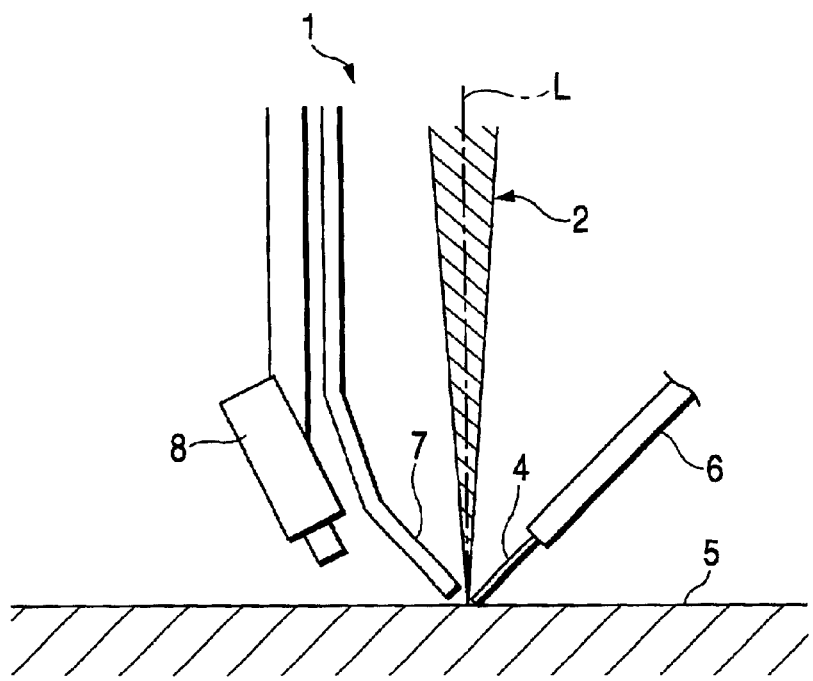
FIG. 3 is a simplified diagram of a laser welding apparatus for use according to the same laser welding method.

Hereinafter, the preferred embodiment of the laser welding method of the present invention will be described in detail with reference to the accompanying drawings. FIG. 3 shows a laser welding apparatus for use in the laser welding method of the present invention. The laser welding apparatus 1 comprises a laser head (not shown) for projecting laser beam 2, a filler wire supplying nozzle 6 for supplying a filler wire 4 to a welding object portion 5, a shield gas nozzle 7, a welding line copy sensor 8 and the like. This laser welding apparatus 1 supplies the filler wire 4 to the welding object portion 5 while projecting laser beam 2 to the welding object portion 5.

In this case, the filler wire 4 is supplied obliquely from forward or backward of the welding advance direction such that an angle θ formed between the supplying direction and the beam axis L of the laser beam 2 is less than 45°. That is, as shown by a phantom line in FIG. 1, the filler wire supplying nozzle 6 may be disposed forward of the laser beam 2 with respect to the welding advance direction so that the filler wire is supplied from forward, or may be disposed backward of the laser beam 2 with respect to the filler wire supplying nozzle 6 so that it is supplied from backward. In each case, the aforementioned angle θ should be less than 45°. In other words, the filler wire 4 is supplied to the welding object portion 5 within a plan including the welding advance direction and beam axis L. Meanwhile, an arrow in FIG. 1 indicates welding advance direction with respect to the welding object portion 5.

Figure 1:
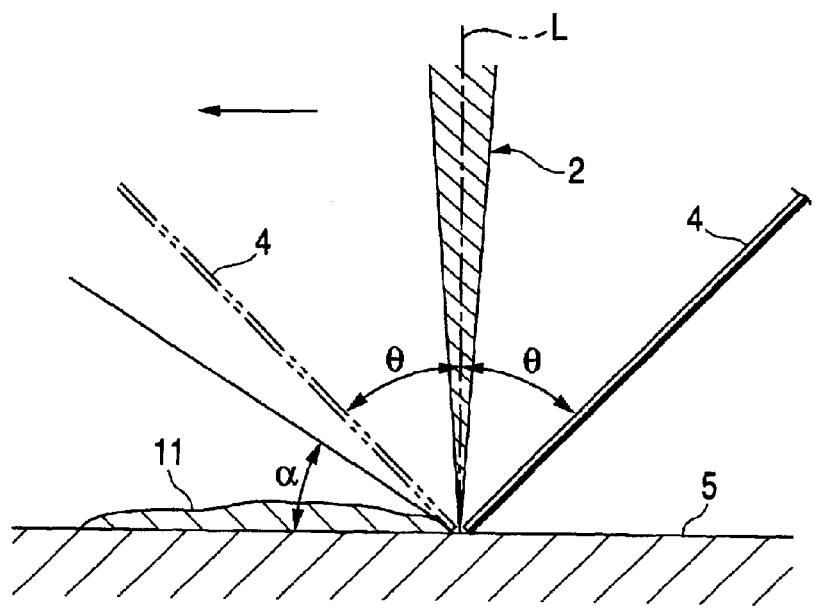
FIG. 1 is a simplified diagram showing an embodiment of the laser welding method of the present invention.
Figure 7:
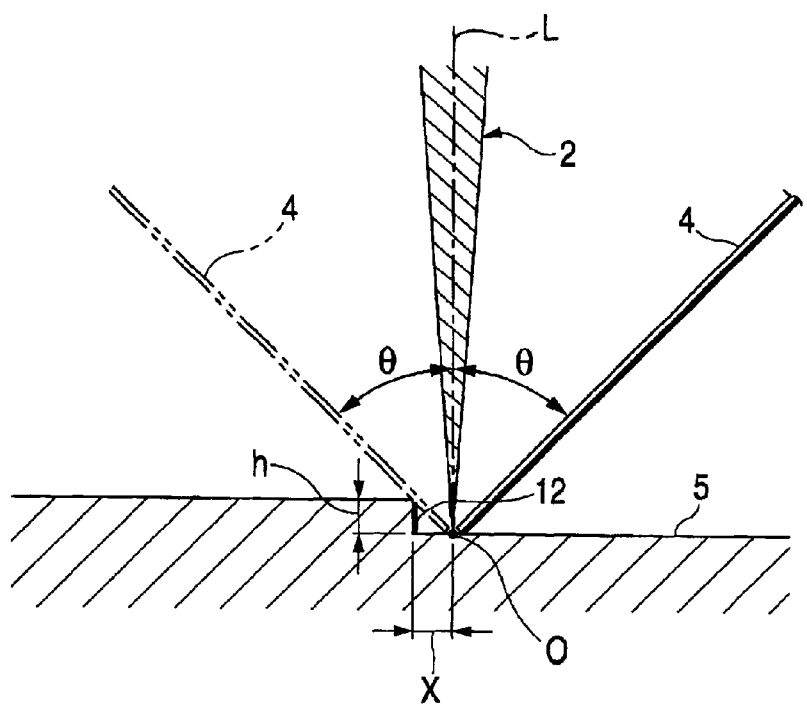
FIG. 7 is a simplified diagram of the laser welding method.

Prior to welding, a preliminary welded portion 11 may exist on the welding object portion 5 as shown in FIG. 1 or a stepped portion 12 may exist as shown in FIG. 7. In this case, if the filler wire 4 is supplied from forward as indicated by the phantom line and the aforementioned angle is more than 45°, the filler wire 4 may be interfered with the preliminary welded portion 11 or the stepped portion 12. If such interference occurs, welding failure may occur. Contrary to this, if the aforementioned angle θ is less than 45°, the filler wire 4 is supplied to the welding object portion 5 in a stabilized condition without interfering the preliminary welded portion 11 because generally, a rise-up angle α is smaller than 45° (for example, about 30° and over 45° as viewed with respect to the laser axis L) even if the preliminary welded portion 11 exists, so that an excellent welding is carried out.

Consider a case where the stepped portion 12 is formed. A dimension X from a processing point O to the stepped portion 12 is h×tan θ when the height of the stepped portion 12 is h, as shown in FIG. 7. The smaller this angle θ, the smaller the dimension X may be. If the angle θ is less than 45°, stabilized welding is achieved without an interference by the stepped portion 12.

Further, if the filler wire 4 is supplied from backward of the laser beam 2 with respect to the welding advance direction, the filler wire 4 can be supplied to the welding object portion 5 in a further stabilized condition without being affected by the preliminary welded portion 11 or the stepped portion 12. Further, if the filler wire 4 is supplied from backward of the laser beam 2 with respect to the welding advance direction, a sensor 8 can be provided in the vicinity of the laser beam 2 forward in the welding advance direction, so that welding line copy accuracy is improved.

Figure 9:
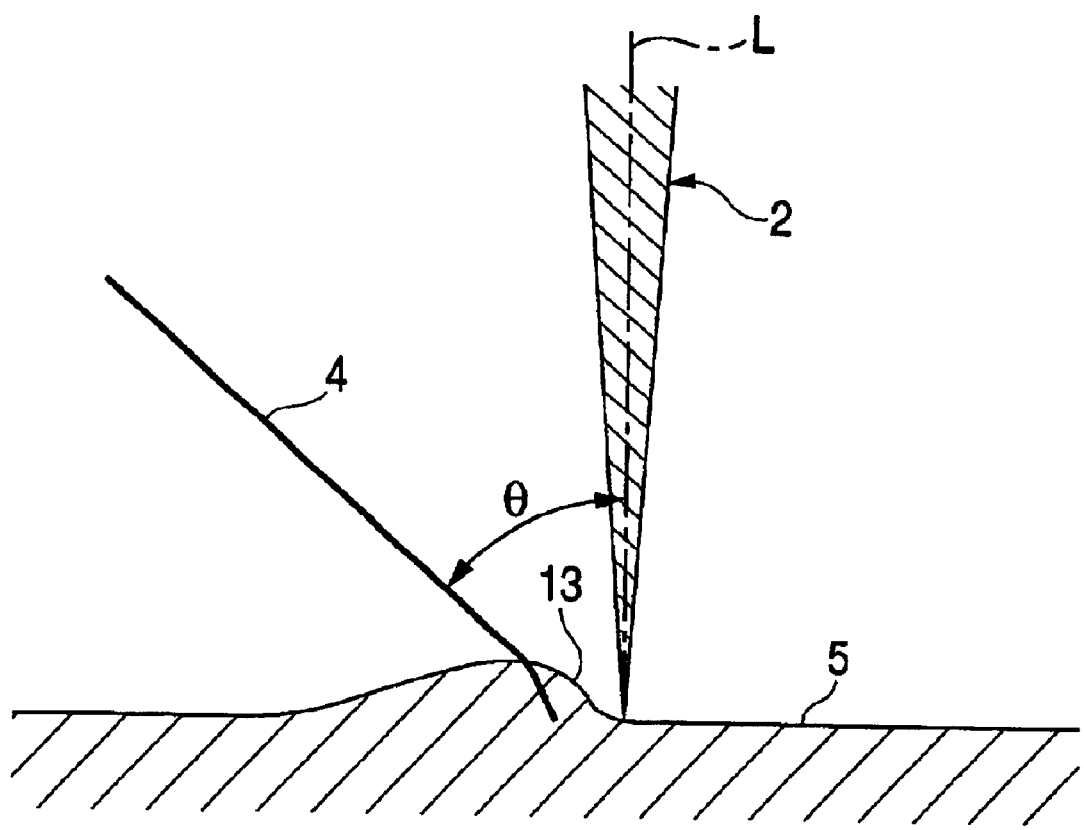
FIG. 9 is an explanatory diagram of defect when an angle between filler wire feeding direction and laser beam axis is not set up.

If the welding speed is increased, the swelling height of a molten portion 13 is increased and correspondingly, its temperature is decreased. Therefore, if the filler wire 4 touches this swelling portion, the temperature of molten metal further drops thereby accelerating solidification. Consequently, the filler wire 4 becomes more likely to be fixed to the solidified wall (wall produced when the molten welding object portion 5 is solidified). Thus, if the aforementioned angle θ exceeds 45° when the filler wire 4 is supplied from backward of the laser beam 2 with respect to the welding advance direction, it is more likely to be in contact with this swollen molten metal, so that as shown in FIG. 9, the filler wire 4 is fixed to the solidified wall. If the aforementioned angle is less than 45°, the filler wire 4 becomes unlikely to touch the molten metal, so that it is supplied successively in a stabilized condition to the welding object portion 5 without being fixed to the solidified wall. This is evident from a result of experiment about the relation between the welding speed and wire insertion angle (angle θ created between the supplying direction of the filler wire and beam axis L of the laser beam 2).

Figure 8:
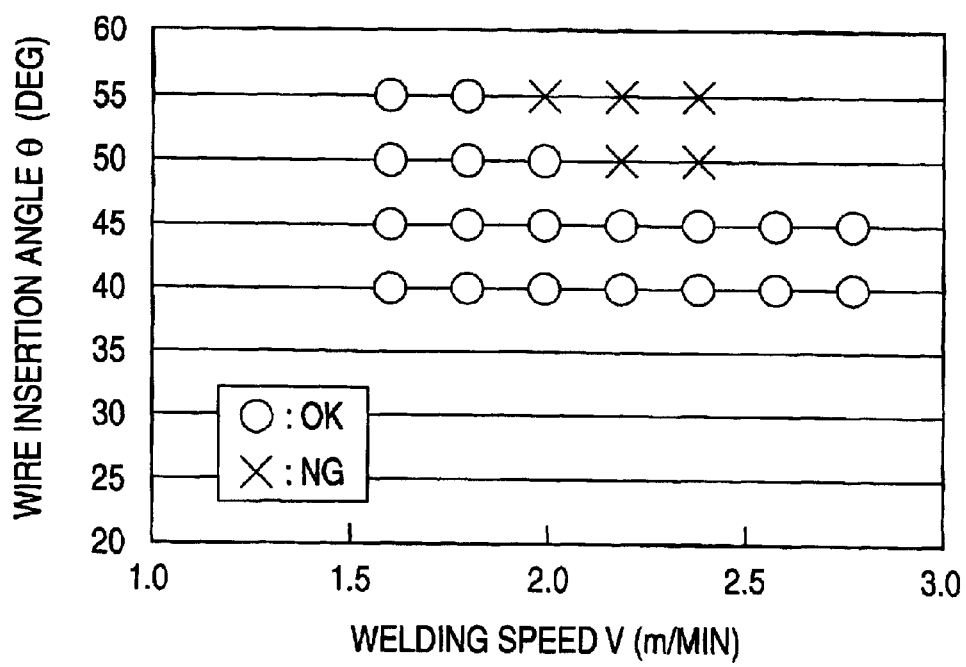
FIG. 8 is a graph showing the relation between welding speed and wire insertion angle of the same laser welding method.

This experiment was carried out using mild steel (JIS-SS400) as a welding material which composes the welding object portion 5 under a condition that the diameter of the filler wire 4 was 1.2 (mm), laser output was 15 (KW), welding speed was 1.6–2.8 (m/min), wire supplying speed was 5.6 (m/min) and shield gas (He) amount is 50 (liters/ min). FIG. 8 shows a result of this experiment. In the graph of FIG. 8, a circle indicates OK (accurate welding was achieved), and a cross indicates NG (such a defect as fixing of the filler wire 4 occurred). This graph indicates that a defect is generated if the aforementioned angle θ exceeds 45°.

Figure 2:
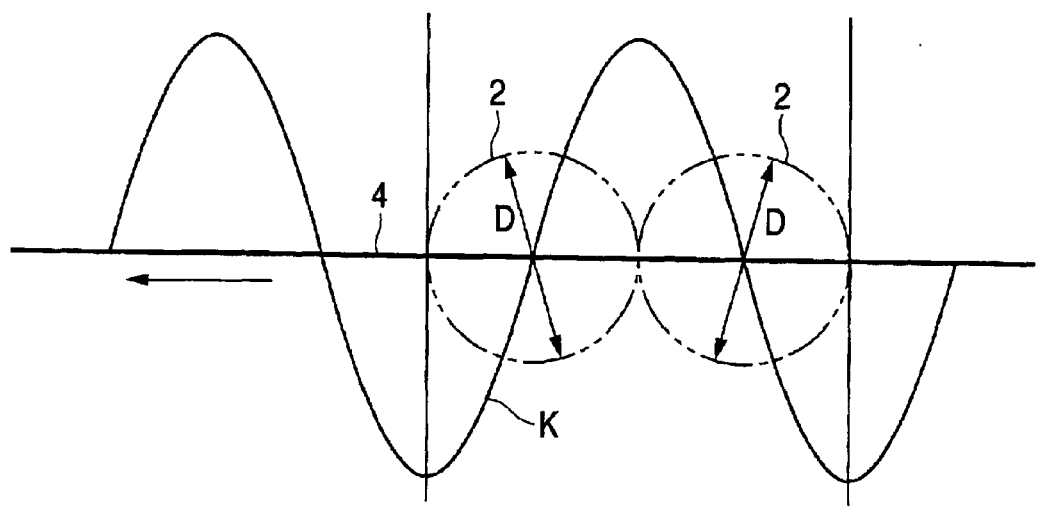
FIG. 2 is a plan view showing a trace of weaving according to the same laser welding method.
Figure 4:
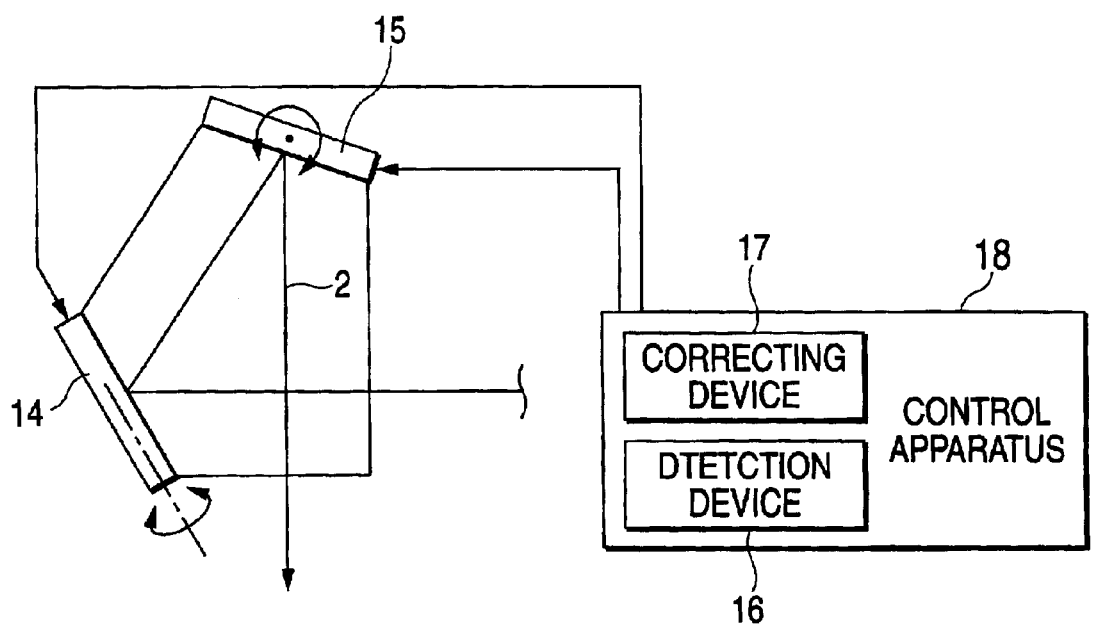
FIG. 4 is a simplified diagram of a scanning device for use in the same laser welding method.

If there is any gap in the welding object portion (welding object member butting portion and the like) 5, the laser beam 2 is weaved in a direction perpendicular to the welding advance direction. That is, FIG. 2 indicates a trace K of the beam axis L of the laser beam 2 with respect to the feeding direction (welding advance direction) of the filler wire 4. As the method for weaving, for example, laser scanning devices 14, 15 shown in FIG. 4 may be used.

The laser scanning devices 14, 15 are disposed freely rotatably and each provided with a mirror for reflecting laser beam 2. These mirrors are rotated within a predetermined angle range so as to scan with the laser beam 2. In this case, a mirror of the laser scanning device 14 is rotatable around a rotation axis parallel to this paper of FIG. 4 and a mirror of the laser scanning device 15 is rotatable around a rotation axis perpendicular to the paper of FIG. 4. Therefore, if the mirror angle of the laser scanning device 14 is changed, the projection position is moved in a direction perpendicular to the welding advance direction and if the angle of the mirror of the laser scanning device 15 is changed, the projection position is moved in a direction parallel to the welding advance direction.

If the aforementioned laser scanning devices 14, 15 are used, the laser beam 2 can be weaved (scanning with the laser beam 2) at a welding position by swinging the mirrors. Meanwhile, the laser scanning devices 14, 15 are controlled by a control apparatus 18 comprising a detection device 16, a correcting device 17 and the like.

Figure 5:
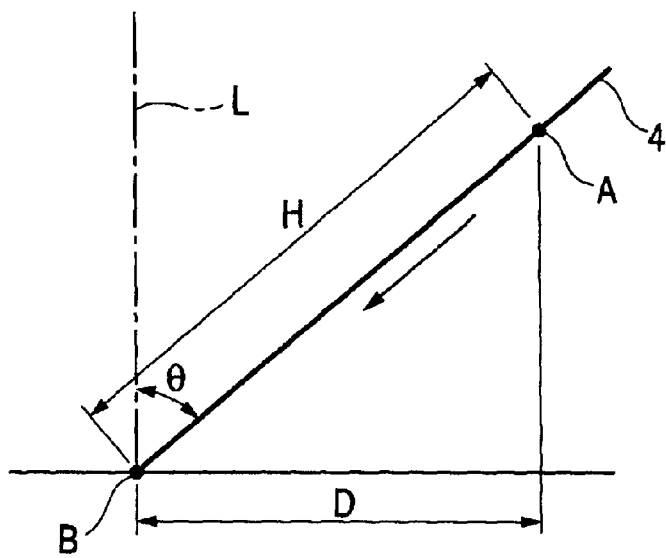
FIG. 5 is an explanatory diagram showing a feeding amount of the beam axis of laser beam according to the laser welding method.
Figure 6:
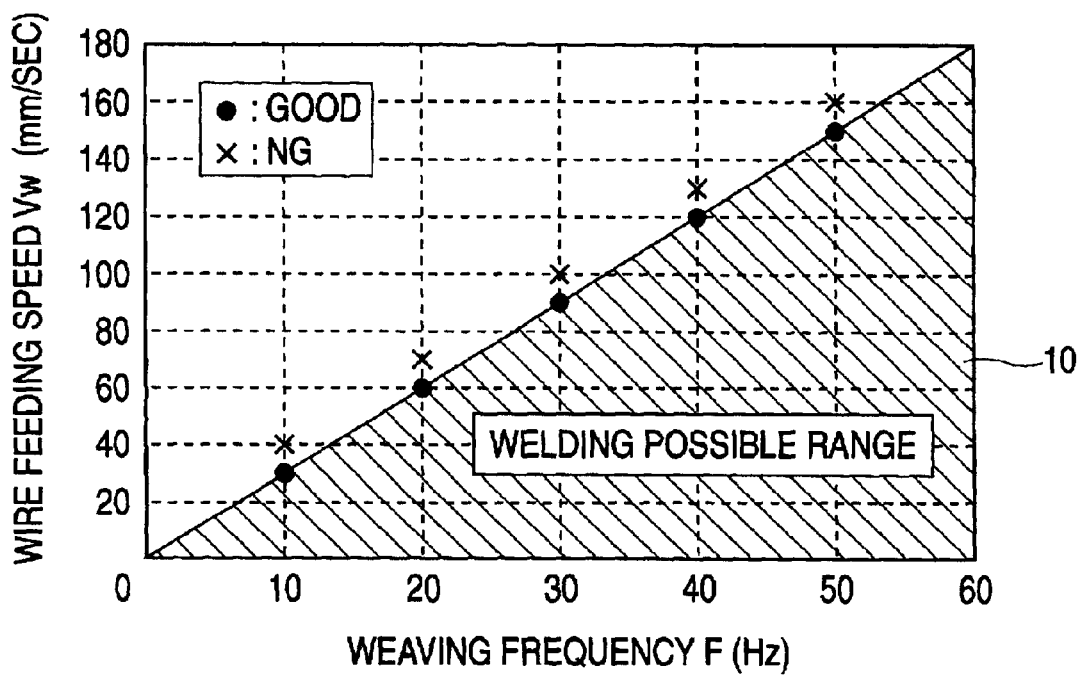
FIG. 6 is a graph showing the relation between weaving frequency and wire feeding speed according to the laser welding method.

When it is assumed that the angle between the feeding direction of the filler wire 4 and the beam axis L of the laser beam 2 is θ(°), the diameter of the key hole is D (mm), the feeding speed of the filler wire 4 is Vw (mm/second), and weaving frequency of the laser beam 2 is F time/second, it is assumed that $Vw/F \leq 2D/\sin\theta$. Energy for melting the filler wire 4 is energy of the laser beam 2, molten metal, laser induced plasma and the like. Energy of the laser beam 2 is mainly used while the others are supplementary. Therefore, at the time of the weaving, the filler wire 4 is cut out when the laser beam 2 crosses the filler wire 4. If the weaving amplitude exceeds the diameter of the filler wire 4, there is generated a probability that the filler wire 4 may not be irradiated by the laser beam 2. In this interval, the filler wire 4 continues to be supplied with its non-melted condition. On the other hand, solidified wall (solid) is formed around the keyhole and molten metal, so that the filler wire 4 is stuck. Thus, it is so set up that the laser beam 2 is projected to the filler wire 4 twice or more per frequency of the aforementioned trace by the above-described limitation so as to prevent the non-molten portion of the filler wire 4 from arriving at the solidified wall. In this case, because a melting possible region by the laser beam 2 is substantially equal to the key hole diameter D, the region irradiated with the laser beam 2 can be replaced with the key hole diameter D for consideration. That is, because the dimension H allowing the filler wire 4 to be fed is a dimension not allowing the non-molten portion to arrive at the solidified wall as shown in FIG. 5, this is a length from a point A in which the beam 2 is projected to a point B on the solidified wall. Because this length (dimension) H is $D/\sin\theta$, the aforementioned $Vw/F \leq 2D/\sin\theta$ is set up based on this dimension H.

If with weaving frequency F(Hz) on the abscissa axis and the wire feeding speed Vw(mm/sec) on the ordinate axis, the relation between this weaving frequency and the wire feeding speed is graphed when the aforementioned angle θ is 45°, a range 10 less than Vw/F=3.0 mm/time is a melting possible range in this case. In this case, the key hole diameter D is set up to about 1.5 mm by setting the beam diameter to 0.7 mm–1.0 mm and the welding speed is set up to 1 m/min. The beam diameter mentioned here refers to the diameter containing $1/e^2$ energy. Under the above-described condition, preferably, the weaving frequency for weaving is set to more than 25 Hz. The reason is that if the weaving frequency is less than 25 Hz, the non-molten portion of the filler wire 4 is more likely to arrive at the solidified wall, so that it is impossible to block the sticking.

The preferred embodiment of the laser welding method of the present invention has been described above. The present invention is not restricted to the above described embodiment, but may be modified in various ways. For example, the angle θ may be set arbitrarily in a range less than 45°. The laser beam 2 is outputted from a laser oscillator (not shown) and collected by a parabolic mirror or the like. To weave the laser beam 2, it is permissible to swing (rotate) that parabolic mirror instead of any one of the scanning devices 14, 15 shown in FIG. 4. Alternatively, it is permissible to project the laser beam 2 along the welding advance direction without weaving.

What is claimed is:

1. A laser welding method, which comprises:

supplying a filler wire to a welding object portion, and welding the welding object portion by immediate physical irradiation of the welding object portion directly by a focused laser beam from a laser source;

wherein the filler wire is supplied obliquely from forward or backward in a welding advance direction such that an angle between the supplying direction of the filler wire and a beam axis of the laser beam is less than 45°.

2. A laser welding method as claimed in claim 1, wherein the filler wire is only supplied from backward of the laser beam with respect to the welding advance direction.

3. A laser welding method as claimed in claim 1, wherein the filler wire is supplied independently from the laser.

4. A laser welding method as claimed in claim 1, wherein the laser beam is supplied in a direction perpendicular to a welding advance direction.

5. A laser welding method, which comprises:

supplying a filler wire to a welding object portion, and welding the welding object portion by irradiation with a laser beam, including weaving the laser beam in a sinusoidal pattern relative to a direction substantially perpendicular to a welding advance direction;

wherein the filler wire is supplied obliquely from forward or backward in the welding advance direction such that an angle between the supplying direction of the filler wire and a beam axis of the laser beam is less than 45°.

6. A laser welding method as claimed in claim 5, wherein the filler wire is supplied from backward of the laser beam with respect to the welding advance direction.

7. A laser welding method which comprises:

supplying a filler wire to a welding object portion, and welding the welding object portion by irradiation with a laser beam, including weaving the laser beam in a direction substantially perpendicular to a welding advance direction;

wherein the filler wire is supplied obliquely from forward or backward in the welding advance direction such that an angle between the supplying direction of the filler wire and a beam axis of the laser beam is less than 45° and the welding is carried out satisfying the following relationship:

$$Vw/F \ 23 \ 2D/\sin \theta$$

where θ is an angle between the beam axis L and a supplying direction of the filler wire, D is key hole diameter, Vw is a supplying speed of the filler wire, and F is a weaving frequency of the laser beam.

8. A laser welding method as claimed in claim 1, wherein the laser beam irradiates the welding object portion without use of an optical fiber.

* * * * *